S. S. UNDERWOOD.
BRAKE BEAM HANGER.
APPLICATION FILED FEB. 21, 1910.
965,965.
Patented Aug. 2, 1910.
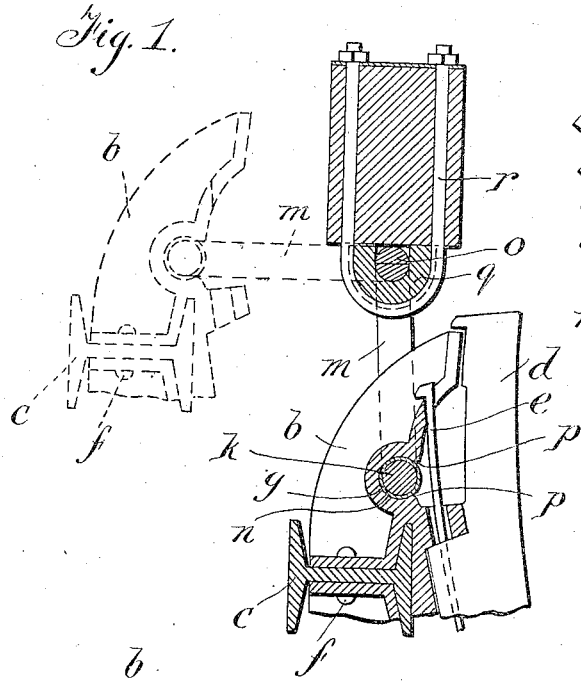
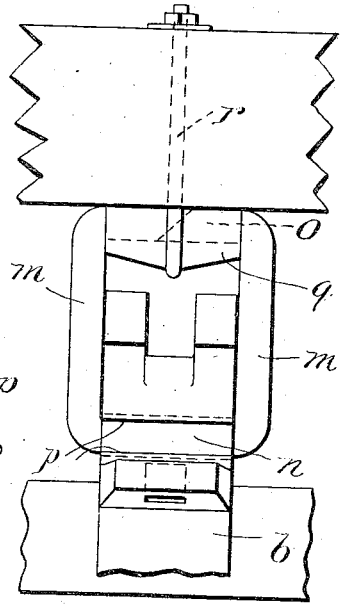
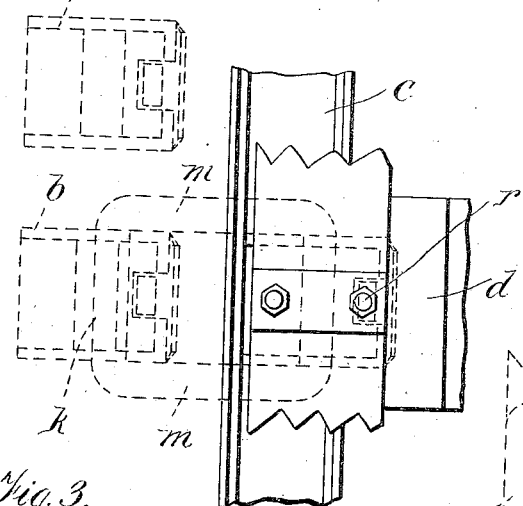

UNITED STATES PATENT OFFICE.

SIDNEY SMITH UNDERWOOD, OF MONTREAL, QUEBEC, CANADA.

BRAKE-BEAM HANGER.

965,965.   Specification of Letters Patent.   Patented Aug. 2, 1910.

Application filed February 21, 1910. Serial No. 545,096.

*To all whom it may concern:*

Be it known that I, SIDNEY SMITH UNDERWOOD, of the city of Montreal, Province of Quebec, Canada, have invented certain new and useful Improvements in Brake-Beam Hangers; and I do hereby declare that the following is a full, clear, and exact description of the same.

The invention has for its object to prevent the brake head and with it the beam from becoming disengaged from the hanger in the event of the brake shoe key being removed; and it may be said briefly to consist of the particular construction of the hanger hereinafter described and pointed out in the claims.

For full comprehension, however, of my invention reference must be had to the accompanying drawings, forming a part of this specification, in which similar reference characters indicate the same parts, and wherein—

Figure 1 is a sectional view of a brake head with brake shoe in place, the brake beam being also shown in transverse section, and the whole supported by my improved hanger; Fig. 2 is a face view thereof; Fig. 3 is a plan view of the parts illustrated in Fig. 1; Fig. 4 is a detail view of the housing for my improved hanger removed; and Fig. 5 illustrates the manner of forming my improved hanger.

The brake head $b$, beam $c$, shoe $d$, and key $e$ for detachably fastening the shoe to the head are of usual construction and well known in the art, there being, of course, a pair of heads and shoes on each beam, and a pair of hangers suspending the brake heads and through them the shoes and beam. The brake heads are fixed to the brake beam by rivets $f$ or otherwise, and each is formed with a transverse socket $g$ having a longitudinal mouth the lips $p$ whereof reduce its width to less than the diameter of the socket $g$ in which the horizontal portion $k$ of its hanger has heretofore been held by the key. This arrangement is defective for the reason that unauthorized persons are enabled to disengage the brake heads, shoes and beam from the hanger by simply removing the keys, and the same disengagement would take place at one or both ends if either or both keys should happen to be displaced by breakage. In order to overcome this defect I so construct the hanging means that the heads will be self held against displacement from the hanger proper while the latter is attached to the truck and readily either set in place in the socket of the head or freed therefrom when the hanger is disconnected from the truck. This embodiment of my invention consists of a one piece hanger of substantially rectangular form, the bearing portion $k$ whereof and the legs $m$ connected thereto are substantially equal in diameter to the space between the lips of the mouth of the socket $g$, to permit the said horizontal portion to be passed endwise into the socket when the hanger is turned to the position shown in dotted lines in Fig. 1.

The member which locks the brake head and hanger together and is locked itself against displacement by the said parts consists of a bushing $n$ preferably in the form of a sleeve. According to this invention the hanger is constructed from a straight bar upon which the sleeve is slipped, the bar is then bent at right angles to form the legs $m$ and again bent to form a trunnion $o$ the ends being preferably welded together. In order to accommodate this hanger the housing casting $q$ is made as usual with a recess to receive the upper cross bar of the hanger, the parts being secured together by the usual U-bolts $r$.

To assemble the brake head and hanger and connect the latter to the truck the hanger is first attached, as just described, to the truck, it is then swung to a horizontal position (see Fig. 1) and thus held as the brake-head is fitted thereon the bearing portion of the hanger and the sleeve or bushing thereon being received endwise into the socket. The effect is that the hanger is free to rotate in the bushing and housing and is held by the bushing against lateral displacement, and it is prevented from longitudinal displacement by the legs straddling the upper portion of the head; while the bushing itself is locked in the socket by the lips of the latter.

With this construction and arrangement the brake heads and means are positively locked against displacement from the hanger while the latter is positively united to the truck, and worn or broken brake shoes may be replaced with new ones, or the shoes stripped from the heads without danger of displacement of the heads and beam, and danger of loss of the hangers and all supported thereby is reduced to a minimum.

I do not make broad claim to the locking device *n* as it is covered by my application Serial No. 545,093 filed Feb. 21, 1910.

What I claim is as follows:

1. The combination with a truck and brake-head having a lateral socket with a mouth of less transverse measurement than the diameter of the socket; of a hanger supporting the brake-head from the truck and consisting of a single piece of metal; adapted to enter the socket endwise; and an intact sleeve inclosing the portion of the hanger engaging the brake-head.

2. The combination with a truck and brake-head having a lateral socket with a mouth of less transverse measurement than the diameter of the socket, of a hanger supporting the brake-head from the truck and consisting of a single piece of metal and comprising a bearing portion and a pair of suspending legs one of the legs of such hanger being of a width to enter the mouth of the socket and an intact sleeve inclosing the portion of the hanger engaging the brake-head.

3. The combination with a brake head having a transverse socket with a longitudinal mouth of less measurement transversely to the socket than the diameter of the said socket, of a hanger the bearing portion whereof is of a thickness to enter the mouth of the socket, and a bushing in the form of an intact sleeve inclosing the said bearing portion of the hanger and serving to prevent lateral displacement of the hanger from the socket.

4. The combination with a truck member and a brake head, having a lateral socket with a mouth of less transverse measurement than the diameter of the socket, of a one piece hanger presenting a trunnion portion and a bearing portion; means fastening the trunnion portion to the truck member and a sleeve fastening the bearing portion to the brake-head, such bearing portion and sleeve being adapted to enter the socket endwise.

5. The combination with a truck member and brake-head, of a hanger having as integral parts thereof a trunnion and arms extending from opposite ends of the trunnion; means rotatably fastening the trunnion to the truck member consisting of a recessed housing containing the said trunnion, and U-bolts securing the housing to the truck member, and means including a sleeve fastening the arms to the brake-head.

In testimony whereof, I have signed my name to this specification, in the presence of two subscribing witnesses.

SIDNEY SMITH UNDERWOOD.

Witnesses:
    WILLIAM P. MCFEAT,
    FRED J. SEAM.